United States Patent [19]

Perren

[11] Patent Number: 5,636,369
[45] Date of Patent: Jun. 3, 1997

[54] FAST PATTERN-DETECTION MACHINE AND METHOD

[75] Inventor: James D. Perren, Simi Valley, Calif.

[73] Assignee: Datron/Transco, Inc., Simi Valley, Calif.

[21] Appl. No.: 451,808

[22] Filed: May 26, 1995

[51] Int. Cl.$^6$ .................................................. H04L 7/00
[52] U.S. Cl. .............. 395/500; 364/571.07; 364/715.11; 375/368
[58] Field of Search .......................... 395/500, 375, 395/425, 23, 421.1; 364/570, 571.07, 715.11, 200 MS File, 955, 955.5, 955.6; 282/14; 382/34, 54; 340/347 DD; 375/1, 95, 368; 380/7

[56] References Cited

U.S. PATENT DOCUMENTS

| | | | |
|---|---|---|---|
| 4,241,402 | 12/1980 | Mayper, Jr. et al. | 364/200 |
| 4,541,115 | 9/1985 | Werth | 282/14 |
| 4,550,436 | 10/1985 | Freeman et al. | 382/34 |
| 4,558,302 | 12/1985 | Welch | 340/347 DD |
| 4,835,733 | 5/1989 | Powell | 364/900 |
| 5,056,014 | 10/1991 | Burrows | 364/200 |
| 5,091,971 | 2/1992 | Ward et al. | 382/54 |
| 5,146,471 | 9/1992 | Cowart | 375/1 |
| 5,280,595 | 1/1994 | Lemay et al. | 395/425 |
| 5,313,496 | 5/1994 | de Goede | 375/95 |
| 5,357,541 | 10/1994 | Cowart | 375/1 |
| 5,452,425 | 9/1995 | Childers et al. | 395/375 |
| 5,463,689 | 10/1995 | Schutte et al. | 380/7 |
| 5,592,518 | 1/1997 | Davis et al. | 375/368 |

OTHER PUBLICATIONS

"ATPG Aspects of FSM Verification", by H. Cho et al., IEEE, Computer–Aided Design, 1990 International Conference, Sep. 1990, pp. 134–137.

"An Adaptive RAM–DFE for Storage Channels", by K. Fisher et al., IEEE Transactions on Communications, vol. 39, No. 11, Nov. 1991, pp. 1559–1568.

"Correcting Dependent Errors in Sequences Generated by Finite–State Processes", by G. Hart et al., IEEE Transactions on Information Theory, vol. 39, No. 4, Jul. 1993, pp. 1249–1260.

"Bitwise Encoding of Finite State Machines", by J. Monteiro et al., IEEE, 7th International Conference on VLSI Design, Jan. 1994, pp. 379–382.

*Primary Examiner*—Kevin J. Teska
*Assistant Examiner*—Russell W. Frejd
*Attorney, Agent, or Firm*—Edward A. Sokolski

[57] ABSTRACT

The invention is a state machine for the detection of a pre-specified pattern of m bits in a stream of bits where the stream of bits is examined in steps, each successive step consisting of the examination of the next successive set of n bits in the stream of bits. The state machine is mechanized by a look-up table. The current set of n bits is combined with a state number representing the current state of the machine to obtain an address for entry into the look-up table. The state number stored in the table at that address is the new state number representing the new state of the machine after the examination of the current set of n bits in the stream. The new state number is then combined with the next successive set of n bits to obtain the next new state number from the table. Thus each new state number becomes the current state number for combination with the next set of n bits to form the address for entry into the table. The process is continued until the state number indicates that the pre-specified pattern of m bits has been detected in the stream of bits.

2 Claims, 1 Drawing Sheet

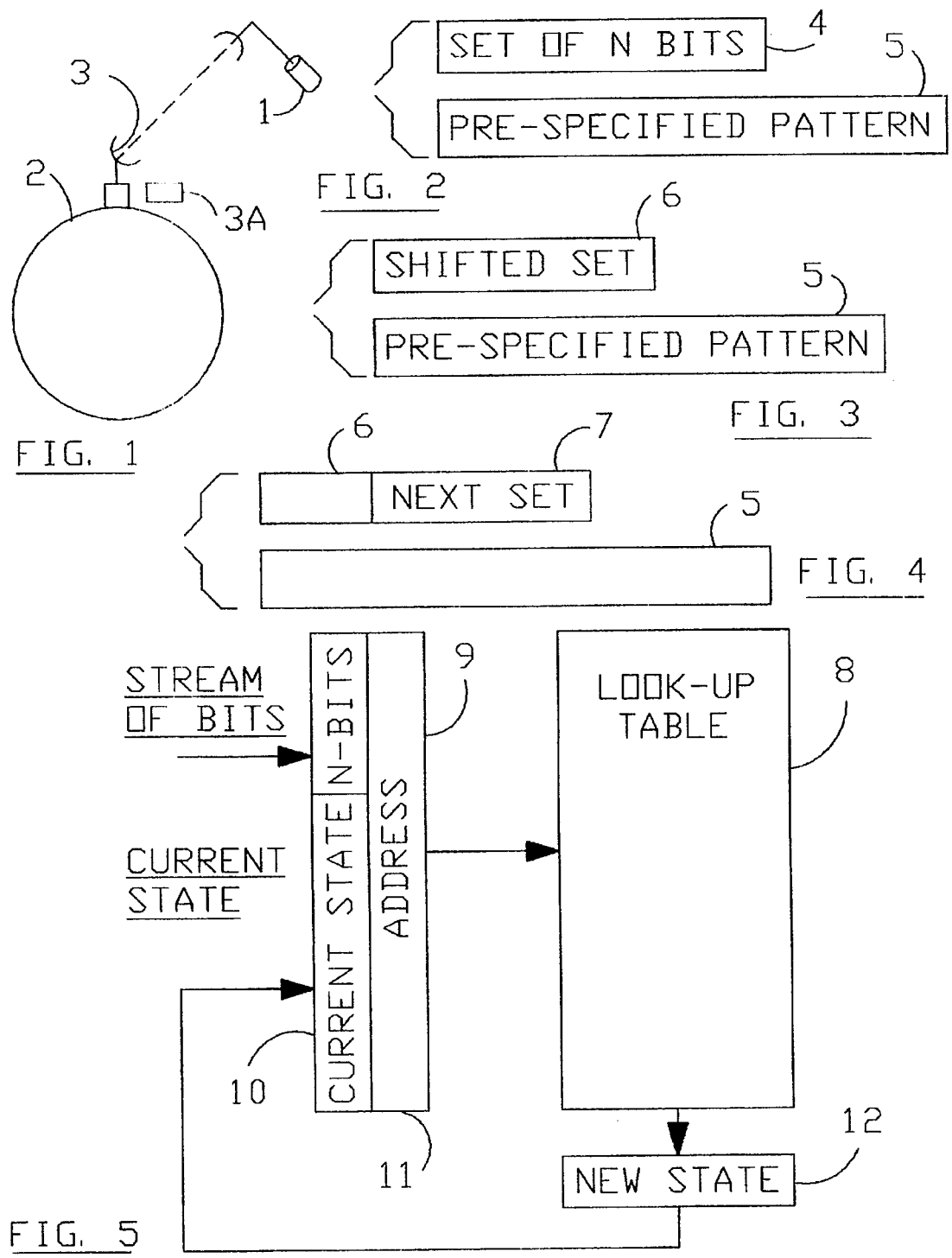

FAST PATTERN-DETECTION MACHINE AND METHOD

BACKGROUND OF THE INVENTION a. Field of the Invention

This invention pertains to the detection of patterns in strings of binary digital data. More particularly, this invention pertains to the detection of a pre-specified sequential pattern of bits in a serial stream of bits for the purpose of detecting the synchronization pattern of bits in a stream of data received by a ground station from a remote sensing satellite.

b. Description of the Prior Art

Remote sensing satellites typically transfer the content of their observations to ground stations by sending a serial string of binary data to the ground station. The satellites usually transmit the content of their observations in a pre-specified binary format and preface the data by a pre-specified sequential pattern of bits, which pattern serves as a synchronization marker that the ground station uses to synchronize its processing of the subsequent bits in the stream.

The classic method for detecting a pre-specified sequential pattern of m bits in a serial stream of bits is to feed the stream of bits, one bit at a time, into a shift register having m stages. A logic network, that is "hard-wired" to the shift register, is configured so as to output a "true" indication only when the pattern of m bits within the shift register matches the pre-specified sequential pattern. Although the classic method is simple in conception and fast in operation, the logic network has to be "hard-wired" for a particular pre-specified pattern and the "hard-wiring" has to be changed whenever the pre-specified pattern is changed.

An alternative method is to use a computer to examine the stream of bits, one bit at a time, and, by means of an algorithm stored within the computer, to "compute" whether or not the immediate string of m bits corresponds to the pre-specified sequential pattern of m bits. Because the algorithm can be changed easily, the method can be easily adapted to detect a new pre-specified sequential pattern. The time required for the execution of the algorithm by the computer, however, limits the speed of this detection method.

SUMMARY OF THE INVENTION

The present invention uses a state machine to detect a pre-specified pattern of bits in the serial stream of bits received by a ground station from a remote-sensing satellite. The ground station then uses the detection of the pre-specified pattern of bits to synchronize its processing of the observational data received from the satellite.

The present invention utilizes the state machine to process a serial stream of bits, n bits at a time, to detect a pre-specified pattern of m bits. The state machine is mechanized by a look-up table where the "look-up" address is a combination of a number representing the current state of the state machine and the next set of n bits in the stream of bits. The number stored at the address in the look-up table, which number is output from the table, represents the new state of the machine after the processing of the set of n bits. The "new" state of the machine is then combined with the next successive set of n bits to provide a new address for entry into the table. The process is repeated with successive sets of n bits from the stream of bits until the state number obtained from the table is a number that indicates that the pre-specified pattern of m bits in the bit stream has been detected.

The invention is adapted easily for the detection of a new pre-specified pattern simply by computing a new set of state numbers which are then stored in the look-up table. The examination of a bit stream by this invention operates at a high rate because the bits are examined in sets of n bits at a time and because the determination of each new state for each new set of n bits requires only the step of entering the look-up table at the address that is the combination of the n bits and the current state number to obtain the number representing the new state of the machine.

BRIEF DESCRIPTION OF THE DRAWINGS

FIG. 1 depicts a remote sensing satellite and the ground station to which it transmits data.

FIG. 2 depicts the comparison of the first set of n bits with the pre-specified pattern of m bits.

FIG. 3 depicts the comparison of the truncated, shifted set of bits with the pre-specified pattern of m bits.

FIG. 4 depicts the comparison with the pre-specified pattern of m bits of the combination of the truncated, shifted set of bits and the next set of n bits.

FIG. 5 is a block diagram of the state machine.

DETAILED DESCRIPTION

Referring to FIG. 1, a remote sensing satellite 1 typically reports its observations of the earth 2 to a ground station 3 by transmitting a serial stream of bits to the ground station. The observations usually are transmitted in a pre-specified format and the observational data is prefaced by a pre-specified pattern of bits that serves as a synchronization marker for the processing of the data contained in the subsequent bits. A computer 3A, at the ground station uses the marker to synchronize its processing of the subsequent data.

Although the accompanying source code listing of software calculates the contents of a look-up table for the detection of a pre-specified 16 bit pattern by processing a stream of bits, 8 bits at a time, it should be understood that the stream of bits could instead be processed n bits at a time, where n is any positive integer and the pre-specified pattern may have some other length.

Conceptually, the invention operates in the following manner. Referring now to FIG. 2, the pre-specified pattern of m bits is depicted in block 1. The first set of n bits in the stream of bits, depicted in block 4, is compared to the first n bits in the pre-specified pattern 5. If all of the bits in the first set of n bits do not match the first n bits in the pattern, then the set of n bits is shifted one step to the left and the set is truncated by discarding the left-most bit. As depicted in FIG. 3, the shifted, truncated set 6 is then compared with the pre-specified pattern 5 to determine if all of the bits in the truncated set match the first n–1 bits of the pattern. The process of shifting the truncated set to the left and truncating the set by discarding the left most bit is repeated until the remaining bits in the truncated set all match the respective left-most bits in the pattern. In other words, the bits from the data stream are repeatedly shifted to the left, with the left most bit being discarded, until the sequence of 1's and 0's in the remaining bits all match the corresponding left-most bits in the pre-specified pattern. The number of bits in the pattern that are matched may then be used as the "state" number. It should be remembered, however, that the "state" number need not be set equal to the number of bits that are matched, but instead could be set to some other number that is associated with and identifies the state.

As depicted in FIG. 4 the next set of n bits 7 is then added to the existing truncated and shifted set 6 to create a new set of bits and this new set is compared with the pre-specified pattern. If all of the bits in the new set do not match the respective bits in the pattern, the new set is shifted one bit to the left, and the leftmost bit is discarded from the set. This process is repeated until all of the bits remaining in the truncated new set match the respective left-most bits in the pattern. The number of bits that are matched may then again be used as the new state number. The general rule is that each time a new set of n bits is added to the set, the set is compared with the pattern and then shifted to the left and truncated until all of the bits remaining in the set match the respective left-most bits in the pre-specified pattern.

The process of adding the next set of n bits to the existing, truncated set of bits and the comparison and shifting and truncating of the set is continued until the bits in the set match, respectively, all of the bits in the pattern, which condition corresponds to the detection of the pre-specified pattern. At this point the number representing the state of the machine, also represents the detection of the pre-specified pattern in the stream of bits. If the detection process is to be continued without interruption, then state numbers may be that represent both the detection of the pre-specified pattern and the states of the right-most bits in the set that extend to the right of the pattern. However, if the detection process is terminated or restarted "from scratch", then a single state number may be used to represent the detection of the pattern without regard to the number of bits remaining to the right of the pattern.

In practice, the invention operates in a much simpler and faster manner. Referring now to FIG. 5 which depicts look-up table 8. The first set of n bits 9 in the stream of bits is combined with a number representing the initial (or current) state of the machine to form the address 11 of data that is stored in look-up table 8. The data stored at the address in the table is the new state number 12 representing the new state of the state machine after the examination of the set of n bits, i.e. after the conceptual processing of the set of n bits in the manner set forth above. Thus, instead of repeatedly performing the shifting, truncating and comparing processes described above, the number stored at the address in the table is the state number that would be obtained by performing the process described above. As a consequence, instead of adding, shifting, truncating and comparing each successive set of n bits, the invention simply looks in the table to obtain the result of such a conceptual process.

The new state number that is obtained from the look-up table is then combined with the next set of n bits to obtain a new address at which the next new state number is located. The process of combining the next set of n bits with the state number to obtain the address of the next new state number is repeated until the new state number that is obtained is a state number that represents the detection of the pre-specified pattern in the stream of bits. Because the processing of each successive n bits requires only the step of combining the set of n bits with the current state number and obtaining the new state number at such address in the look-up table, the processing is very simple and fast.

Once the pre-specified pattern is detected, the computer 3A at the ground station may then process the succeeding data according to the pre-specified format.

If the arrangement of 1's and 0's in the pre-specified pattern is altered to a new pre-specified pattern, one only need compute a new set of state numbers and place the new set of state numbers into the look-up table. The following listing is an example of a computer program, written in the "C++" programming language, that may be used to compute a set of state numbers for insertion into the look-up table for a pre-specified pattern that is 64 bits in length and which is used to examine the bit stream 8 bits at a time. In the example, the state number of 64 represents the detection of the pre-specified pattern. In this example the pre-specified 64-bit pattern appears, and is defined in, the variable longint__t sync__pattern.

For a state machine that is used for detection of a pattern that is m bits in length and which searches in steps of n bits at a time, each address will be $\log_2(m+n)+n$ bits in length and the state number, i.e. the data, stored at each address will be $\log_2(m+n)$ bits in length. If the pattern detection process stops after the detection of one pattern then the length of the state number, i.e. the length of the data, stored at each address may be reduced to $\log_2(m)$ bits and the length of the address may be reduced to $\log_2(m)+n$.

The following listing is in three parts. Part 1 is titled LONGINT.H—Include file and appears on pages 10 through 14. Part 1 is an "include" file used by the programs listed in parts 2 and 3. Part 2, which appears on pages 15 through 20, is a program that builds the state table that is used in the invention. The particular pattern of bits that is to be detected is hard coded in the definition of longint__tsync__pattern. Part 3, which appears on pages 21 through 25 is a test program that reads data from a file and searches that data for the specified pattern of bits. The program in part 3 illustrates the operation of the invention.

LONGINT.H - Include File

```
/* definition of a long (64 bit) integer class type
 * intended only for use in swfs table generation software
 */ ifndef LONGINH_H
define LONGINH_H
#include <stdio.h>
class longint_t
{
private:
    unsigned long val[2];

public:
    longint_t (unsigned long v0, unsigned long v1)
    {
        val[0] = v0;
        val[1] = v1;
    }
    longint_t (void)
    {
        val[0] = 0;
        val[1] = 0;
    }
    longint_t operator| (longint_t &other)
    {
        longint_t temp;
```

4/19/95

```
    temp.val[0] = val[0] | other.val[0];
    temp.val[1] = val[1] | other.val[1];
    return temp;
} longint_t operator& (longint_t &other)
{
    longint_t temp;
    temp.val[0] = val[0] & other.val[0];
    temp.val[1] = val[1] & other.val[1];
    return temp;
} longint_t operator^ (longint_t &other)
{
    longint_t temp;
    temp.val[0] = val[0] ^ other.val[0];
    temp.val[1] = val[1] ^ other.val[1];
    return temp;
} longint_t operator<< (int other)
{
    longint_t temp;
    if (other < 32)
    {
        temp.val[0] = val[0] << other;
        temp.val[0] |= val[1] >> (32 - other);
        temp.val[1] = val[1] << other;
```

```
    }
    else
    {
        temp.val[0] |= val[1] << (other - 32);
        temp.val[1] = 0;
    }
    return temp;
} longInt_t operator>> (int other)
{
    longInt_t temp;
    if (other < 32)
    {
        temp.val[1] = val[1] >> other;
        temp.val[1] |= val[0] << (32 - other);
        temp.val[0] = val[0] >> other;
    }
    else
    {
        temp.val[1] |= val[0] >> (other - 32);
        temp.val[0] = 0;
    }
    return temp;
}
//
// The add operator adds extra bits of pattern to the end of the pattern
```

```
longint_t operator+ (int other)
{
    longint_t temp;
    temp.val[0] = val[0] << 8;
    temp.val[1] = val[1] << 8;
    temp.val[0] |= val[1] >> 24;
    temp.val[1] |= (other & 0x00ff);
    return temp;
} int operator== (longint_t &other)
{
    return(val[0] == other.val[0]) && (val[1] == other.val[1]);
} void dump ()
{
    printf("[%0.8lx %0.8lx]\n",val[0],val[1]);
}
void dump (FILE *f)
{
    fprintf(f,"[%0.8lx %0.8lx]\n",val[0],val[1]);
}
```

);
endif

```
/* syncmake.cpp
 * state table generator
 * J. Perren
 *
 * Program to build the table that the sync detectorFSM will use.
 * This is currently hardcoded to be the SPOT 64 bit sync pattern.
 */
#include "longint.h"
#include <stdio.h>
include <stdlib.h>
#include <iostream.h>
#define MAXSTATES (64 + 8)

struct state_t
{
    longint_t pattern;
    unsigned char next_state[256];
} state[MAXSTATES];

unsigned int table[0x8000];

main()
{
    FILE *log;
    FILE *out;
```

FIG. 2

```
longint_t sync_pattern(0x04314f43,0x25bb357e);
longint_t all_ones(0xffffffff,0xffffffff);
longint_t temp_pattern, other_pattern;
int state_count,
        input,
        next_state,
        i;
long address;
log = fopen("syncmake.log","w");

//
// Fill in the patterns in the state table
//

// normal states
for (state_count = MAXSTATES-8; state_count >= 0; state_count--)
{
    state[state_count].pattern = ((sync_pattern << (MAXSTATES - 8 - state_count))>>(MAXSTATES - 8 - state_count));
    state[state_count].pattern = (sync_pattern )>>(MAXSTATES - 8 - state_count);
    fprintf(log,"state %d:",state_count);
    state[state_count].pattern.dump(log);
}
// end states
for (state_count = MAXSTATES-8; state_count < MAXSTATES; state_count++)
{
    state[state_count].pattern = (sync_pattern << (state_count - (MAXSTATES - 8)));
    state[state_count].pattern.dump(log);
```

4/19/95

```
//
// Find the highest matching patterns, for each state, input combination.
//
fprintf(log,"=================\n");
for (state_count = 0; state_count < MAXSTATES-8; state_count++)
for (state_count = 0; state_count < 20; state_count++)
{
    for (input = 0; input < 0x100; input++)
    {
        temp_pattern = state[state_count].pattern+input;
        // find the highest pattern that matches
        next_state = 0;
        for (i = state_count+8; i >= 0; i--)
        {
            if (i > (MAXSTATES-8))
            {
                other_pattern = all_ones << (i-(MAXSTATES-8));
                other_pattern = temp_pattern & other_pattern;
                if (other_pattern == state[i].pattern)
                {
                    next_state = i;
                    break;
                }
            }
            else
```

L1

4/19/95

```
                        other_pattern = all_ones >> ((MAXSTATES-8) - l);
                        other_pattern = temp_pattern & other_pattern;
                  if (other_pattern == state[j].pattern)
                  {
                        next_state = i;
                        break;
                  }
            }
      }
      state[state_count].next_state[input] = next_state;
}

// debugging check of the state of the states
//
/*
fprintf(log, "================================\n");
for ( i = 0; i < MAXSTATES; i++)
{
      fprintf (log, "state %d:\n", i);
      state[i].pattern.dump(log);
      for ( int j = 0; j < 0x100; j++)
      {
            fprintf(log, " %2d", state[i].next_state[j]);
            if ((j % 32) == 31)
```

```
                fputc('\n',log);
        }
}

// fill in the look up table
//
puts("filling look up table\n");
for ( state_count = 0; state_count < MAXSTATES; state_count++)
{
        for (input = 0; input < 0x100; input++)
        {
                if (state[state_count].next_state[input] >= MAXSTATES - 8)
                {
                        table[state_count<<8 | input] = state[state_count].next_state[input] | 0x80;
                }
                else
                {
                        table[state_count<<8 | input] = state[state_count].next_state[input];
                }
        }
}
```

```
// write out the table
//
if ((outf = fopen("table.h","w")) == NULL)
    fprintf(stderr,"unable to open table.h for writing\n");
puts("writing table\n");
fputs("\n",outf);
fputs(" * sync pattern table\n",outf);
fputs(" */\n",outf);
fputs("unsigned char table[] = {\n",outf);
for (address = 0; address < (MAXSTATES<<8) -1; address++)
{
    if ((address % 32) == 0)
        fprintf(outf,"/*%d*/ ",address>>8);
    fprintf(outf, "%d,",table[address]);
    if ((address % 32) == 31)
        fprintf(outf, "\n");
}
fprintf(outf,"%d",table[(MAXSTATES<<8)-1]);
fprintf(outf,"\n");
fputs("};\n",outf);
fclose(outf);
}
```

```
// table scanning test program;
// initial version:

//      Run on a block of memory multiple times, this is for timing purposes
//      The algorithm is going through a look uip table. The algorithm requires
//      one look for each byte of input data, ans a consequence the timing
//      performance will be insensitive to whether the table is actually correct or not...
//      renamed to SYCNTIME // slightly more usefull version:

//      read a file and search it for sync. at each byte print out the current
//      state of the machine, and the last 64 bits of the input data. The file
//      is read into a dummy frame. Only the first 7000 bytes are read. This
//      program can be used as a test bed for pattern validity.
//      input file is hard coded as testpat.dat this is called SYNCCHEK include <stdio.h>
include <stdlib.h>
#include <time.h>
#include "table.h"
#include "longint.h"

inline int table_scan(int val)
{
    return table[val];
```

4/19/95

```
unsigned char test_data[7000];
struct tm *newtime;
time_t aclock;
char state;
int result;

main()
{
FILE *testpat;
FILE *log;
longint_t lastbits;
// read frame
//
    testpat = fopen("spot.in","rb");
    log = fopen("testpat.log","w");
    for (int j = t; j < 7000; j++)
    {
        test_data[j] = (fgetc(testpat) & 0xff);
    }
    * pattern immediately
```

FIG. 22

4/19/95

```
test_data[0] = 0x04;
test_data[1] = 0x31;
test_data[2] = 0x4F;
test_data[3] = 0x43;
test_data[4] = 0x25;
test_data[5] = 0xBB;
test_data[6] = 0x35;
test_data[7] = 0x7E;
}
/* Pattern byte alligned some way in
    test_data[100] = 0x04;
    test_data[101] = 0x31;
    test_data[102] = 0x4F;
    test_data[103] = 0x43;
    test_data[104] = 0x25;
    test_data[105] = 0xBB;
    test_data[106] = 0x35;
    test_data[107] = 0x7E;
}
/* Pattern shifted by 4 bits, only because it is easy to type in!
 *
    test_data[100] = test_data[100] & 0xf0;
    test_data[101] = 0x43;
    test_data[102] = 0x14;
```

```
            test_data[103] = 0xF4;
            test_data[104] = 0x32;
            test_data[105] = 0x5b;
            test_data[106] = 0xB3;
            test_data[107] = 0x57;
            test_data[108] = 0xE0;
*/

//
// scan frame
//
    state = 0;
    for (j = 0; j < 500; j++)
    {
        fprintf(log,"address: %d state: %d, data:" ,j,state,test_data[j]);
        state = table_scan((state << 8)|test_data[j]);
        lastbits = lastbits + test_data[j];
        fprintf(log,"new state: %d",state);
        lastbits.dump(log);
        if (state < 0)
        {
            fprintf(log,"Eureka! %d bits offset\n", (state & 0x07));
            exit(0);
```

I claim:

1. A state machine for the detection of a pre-specified sequential pattern of bits in a serial stream of bits, the state machine processing the serial stream in steps of n bits at a time, each successive step processing the next successive set of n bits in the serial stream of bits, the state of the state machine being represented by a state number, which state number is replaced by a new state number in response to the processing of each set of n bits, and at least one state number representing the detection of the pre-specified sequential pattern of bits, the state machine comprising:

a look-up table having an input and an output, the output of the look-up table being a number representing the new state of the state machine after the processing of a set of n bits in the stream of bits and the input of the table being an address of data contained within the table, the address being comprised of the combination of the set of n bits that is being processed by the state machine and the number representing the state of the machine, the data at the address being a new state number representing the new state of the state machine after the processing of the set of n bits, the new number being combined with the next set of n bits to be the address for entry into the look-up table to obtain the number representing the next new state of the state machine.

2. A process using a state machine for detecting a pre-specified sequential pattern of bits in a serial stream of bits, the state machine processing the serial stream in steps of n bits at a time, each successive step processing the next successive set of n bits in the serial stream of bits, the state of the state machine being represented by a state number, which state number is replaced by a new state number in response to the processing of each set of n bits, the state machine having a look-up table having an input address and an output and having numbers representing the new state numbers being stored in the table and at least one state number representing the detection of the pre-specified sequential pattern of bits, the process comprising:

first, combining the number representing the state of the state machine with the next successive set of n bits in the serial stream of bits to form a combined address, second, entering the look-up table at the input address corresponding to the combined address and obtaining a state number representing the new state of the state machine, repeating the first and second steps until the state number obtained from the look-up table is the state number representing the detection of the pre-specified sequential pattern of bits.

* * * * *